United States Patent [19]
Howie et al.

[11] Patent Number: 5,543,692
[45] Date of Patent: Aug. 6, 1996

[54] METHOD AND APPARATUS FOR CONTROLLING AN ELECTRIC MOTOR FOR MOVING A MEMBER

[75] Inventors: David M. Howie, Northville; Abbas M. Youssef, Farmington Hills, both of Mich.

[73] Assignee: TRW Inc., Lyndhurst, Ohio

[21] Appl. No.: 251,754

[22] Filed: May 31, 1994

[30] Foreign Application Priority Data

May 28, 1994 [FR] France .................. 9306475

[51] Int. Cl.$^6$ .................................... H02P 1/00
[52] U.S. Cl. .................. 318/282; 318/280; 318/469; 318/468; 318/466
[58] Field of Search ................... 318/282, 280, 318/469, 468, 466, 610, 254, 439, 138

[56] References Cited

U.S. PATENT DOCUMENTS

| | | |
|---|---|---|
| 3,891,909 | 6/1975 | Newson . |
| 4,249,117 | 2/1981 | Leukhardt et al. ............. 318/466 |
| 4,335,339 | 6/1982 | Brickner . |
| 4,394,605 | 7/1983 | Terazawa . |
| 4,453,112 | 6/1984 | Sauer et al. .................... 318/282 |
| 4,628,234 | 12/1986 | Mizuta et al. . |
| 4,641,067 | 2/1987 | Tizawa et al. . |
| 4,686,598 | 8/1987 | Herr . |
| 4,701,684 | 10/1987 | Seidel et al. .................... 318/282 |
| 4,746,845 | 5/1988 | Mizuta et al. . |
| 4,891,764 | 1/1990 | McIntosh ..................... 318/466 |
| 4,900,994 | 2/1990 | Mizuta . |
| 5,069,000 | 12/1991 | Zuckerman . |
| 5,162,711 | 11/1992 | Heckler . |
| 5,278,480 | 1/1994 | Murray . |

*Primary Examiner*—William M. Shoop, Jr.
*Assistant Examiner*—Karen Masih
*Attorney, Agent, or Firm*—Tarolli, Sundheim, Covell, Tummino & Szabo

[57] ABSTRACT

An electric motor (20) is controlled to move a vehicle window (28) between an upper limit position and a lower limit position. The rate of change of current flow to the motor is determined during upward movement of the vehicle window toward the upper limit position. A threshold rate of change of current flow value to the motor is stored which is a function of a plurality of determinations made of the rate of change of current flow to the motor during upward movements of the vehicle window toward the upper limit position. The stored threshold rate of change of current flow value is modified on each movement of the vehicle window to the upper limit position to make the stored threshold rate of change of current flow value a function of the determinations made of the rate of change of current flow to the motor which are most current in time. The motor reverses and moves the vehicle window downward toward the lower limit position in response to a determined rate of change of current flow to the motor exceeding the threshold rate of change of current flow value during movement of the vehicle window upward toward the upper limit position.

19 Claims, 4 Drawing Sheets

METHOD AND APPARATUS FOR CONTROLLING AN ELECTRIC MOTOR FOR MOVING A MEMBER

TECHNICAL FIELD

The present invention relates to controlling an electric motor for moving a member between two limit positions, and is particularly directed to a method and apparatus for controlling an electric motor to move a vehicle window downward upon an obstruction being detected in the travel path of the vehicle window during upward movement of the vehicle window.

BACKGROUND OF THE INVENTION

Control systems for controlling operation of an electric motor to move a vehicle window between upper and lower limit positions are known. Some known control systems reverse the electric motor to move the vehicle window downward toward the lower limit position upon an obstruction being encountered in the travel path of the vehicle window during upward movement of the vehicle window toward the upper limit position. Some control systems measure current flow through the electric motor and then compare the measured current flow with a predetermined threshold current flow value. If the measured current flow exceeds the predetermined threshold current flow value, such as occurs upon an obstruction being encountered in the travel path of the vehicle window during its movement toward the upper limit position, the electric motor is commanded to reverse its operation to move the vehicle window to the lower limit position. Also, some control systems measure the rate of change of current flow through the electric motor and use the measured rate of change of current flow as a reversal criterion, such as disclosed in U.S. Pat. No. 4,686,598.

SUMMARY OF THE INVENTION

In accordance with the present invention, an apparatus controls operation of an electric motor for moving a member between a first limit position and a second limit position. The apparatus comprises means for determining the rate of change of current flow to the motor during each movement of the member toward the second limit position. The apparatus also includes means for storing a threshold rate of change of current flow value which is a function of a plurality of determinations made of the rate of change of current flow to the motor during movement of the member toward the second limit position. Further, the apparatus includes means for modifying the stored threshold rate of change of current flow value on each movement of the member toward the second limit position to make the stored threshold rate of change of current flow value a function of the determinations made of the rate of change of current flow to the motor which are most current in time. Moreover, the apparatus includes means for reversing the motor to move the member toward the first limit position in response to a determined rate of change of current flow to the motor exceeding the stored threshold rate of change of current flow value during movement of the member toward the second limit position.

Preferably, the member is a vehicle window which is movable between an upper limit position and a lower limit position. The plurality of determinations, preferably, include five determinations made of the rate of change of current flow to the motor during upward movements of the vehicle window toward the upper limit position. The stored threshold rate of change of current flow value is, preferably, an average value of the plurality of determinations made of the rate of change of current flow to the motor during upward movements of the vehicle window toward the upper limit position.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

The present invention relates to controlling an electric motor to move a member between two limit positions, and more specifically relates to controlling the electric motor to reverse movement of the member upon an obstruction being encountered in the travel path of the member during movement of the member from one limit position to the other limit position. There are numerous applications to which the present invention may be applied. By way of example, the present invention is shown in FIG. 1 as applied to an energizable, reversible electric motor 20 for, when energized, activating a vehicle window mechanism 24 to move a vehicle window 28 between an upper limit position and a lower limit position.

Figure 1:
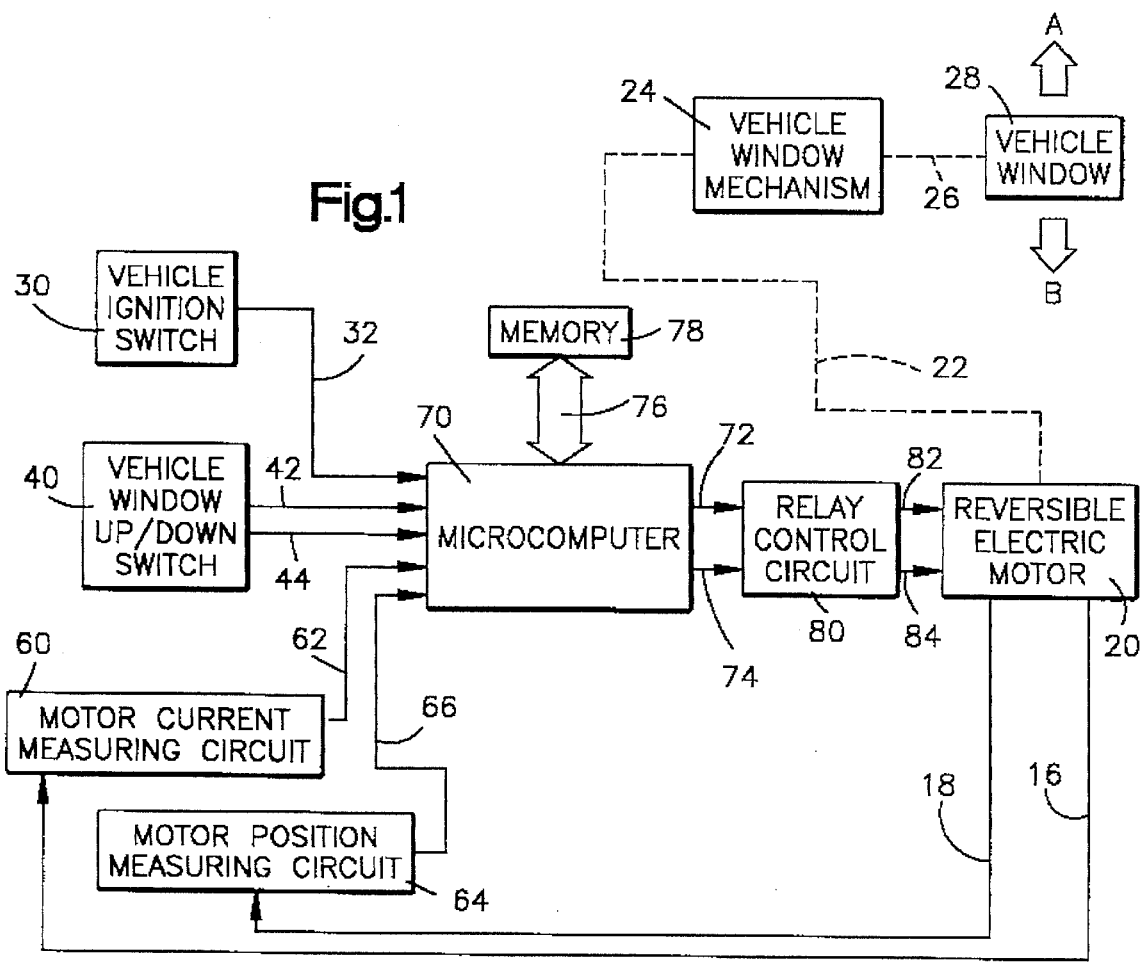
FIG. 1 is a schematic block diagram of a control apparatus for carrying out the present invention.

As shown in FIG. 1, the motor 20 is mechanically coupled (shown schematically in FIG. 1 by dotted line 22) to the mechanism 24. The mechanism 24 is, in turn, mechanically coupled (shown schematically in FIG. 1 by dotted line 26) to the vehicle window 28. When the motor 20 is energized to turn in one direction, the mechanism 24 is activated to move the window 28 in a direction toward the upper limit position (indicated by arrow A). When the motor 20 is energized to turn in the opposite direction, the mechanism 24 is activated to move the window 28 in the opposite direction toward the lower limit position (indicated by arrow B).

A vehicle ignition switch 30 provides an enabling signal on line 32 when the vehicle ignition is turned on. A vehicle window up/down switch 40 provides a signal on line 42 when the switch 40 is pressed to the "UP" position. Similarly, the switch 40 provides a signal on line 44 when the switch 40 is pressed to the "DOWN" position.

The motor 20 provides a signal on line 16 indicative of the direction and amount of current flow to the motor 20. A motor current measuring circuit 60 monitors the current flow signal on line 16 from the motor 20 and provides a corresponding signal on line 62 which is proportional to the current flow signal on line 16.

The motor 20 provides a signal on line 18 indicative of the position of the vehicle window 28 between its upper and lower limit positions. The position signal on line 18 may be, for example, an output of a potentiometer operatively connected to the motor 20. Alternatively, the position signal on line 18 may be the output of a device which counts the number of pulses generated by rotation of the motor 20. A motor position measuring circuit 64 monitors the position signal on line 18 and provides a corresponding signal on line 66 which is proportional to the position signal on line 18 from the motor 20.

A microcomputer 70 monitors the signal on line 32 from the vehicle ignition switch 30, the signal on line 42 from the up/down window switch, the signal on line 62 from the motor current measuring circuit 60, and the signal on line 66 from the motor position measuring circuit 64. The microcomputer 70 is electrically connected with an external memory 78 via bus lines 76. The microcomputer 70 generates control signals on lines 72, 74 in response to the signals on lines 32, 42, 62, 66. The control signals on lines 72, 74 are generated in accordance with a preprogrammed procedure stored in an internal memory and/or the external memory 78 electrically connected with the microcomputer 70. Microcomputers are readily available in the commercial market. Their internal structure and operation are well known in the art, and therefore, the microcomputer 70 will not be described herein.

The control signals on lines 72, 74 from the microcomputer 70 are applied to a relay control circuit 80 to control operation of the relay control circuit 80. When the control signal on line 72 is applied to the relay control circuit 80, the relay control circuit 80 connects AC power to power lines 82, 84 which are applied to the motor 20. The motor 20 turns in a direction which moves the vehicle window 28 to the lower limit position. When the control signal on line 74 is applied to the relay control circuit 80, the relay control circuit 80 connects AC power of opposite polarity to power lines 82, 84. The motor 20 turns in the opposite direction which moves the vehicle window 28 to the upper limit position.

Figure 2:
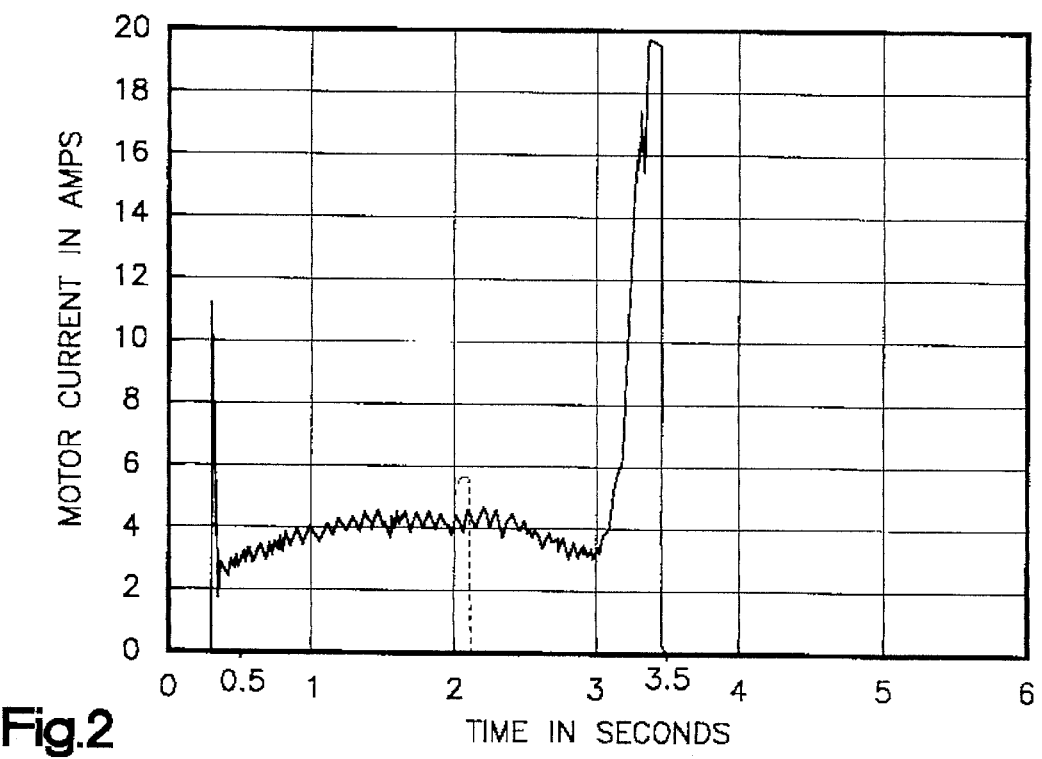
FIG. 2 is a time diagram illustrating motor current versus time characteristics of an electric motor used to move a vehicle window in FIG. 1 from a lower limit position to an upper limit position.

Referring to FIG. 2, a time diagram depicts the motor current versus time characteristics of the motor 20 during movement of the vehicle window 28 from the lower limit position to the upper limit position. As depicted in FIG. 2, the up/down switch 40 is pressed to the "UP" position at time t=0 to move the vehicle window 28 from the lower limit position to the upper limit position. A surge of current flows to the motor 20 when the motor 20 is initially energized to move the vehicle window 28 from the lower limit position to the upper limit position.

After the initial current surge, the normal operating motor current value for the motor 20 is about 4 to 8 amps. As depicted in FIG. 2, the normal operating motor current value for the motor 20 is about 4 amps. When the vehicle window 28 reaches the upper limit position (depicted at about time t=3 seconds in FIG. 2), the motor current increases to a peak current value of about 20 amps. When the motor current reaches the peak current value of about 20 amps at about time t=3.5 seconds, the microcomputer 70 commands the relay control circuit 80 to disconnect power to power lines 82, 84 to the motor 20 such that the motor current decreases essentially instantaneously to zero.

The time diagram of FIG. 2 also depicts the motor current versus time characteristics of the motor 20 upon an obstruction being encountered in the travel path of the vehicle window 28 during movement of the vehicle window 28 from the lower limit position to the upper limit position. As depicted in dotted line at about time t=2 seconds in FIG. 2, an obstruction is encountered in the travel path of the vehicle window 28 during movement of the vehicle window 28 from the lower limit position to the upper limit position. When this occurs, the motor current increases almost instantaneously. As depicted in FIG. 2, the motor current increases almost instantaneously to a current value of about 6 amps.

When the motor current increases almost instantaneously, such as depicted at about time t=2 seconds, and the vehicle window 28 has not reached the upper limit position, the microcomputer 70 determines that such a condition is indicative of an obstruction being encountered in the travel path of the vehicle window 28. When the microcomputer 70 makes this determination, the microcomputer 70 commands the relay control circuit 80 to disconnect power to power lines 82, 84 to the motor 20 such that the motor current decreases essentially instantaneously to zero. The microcomputer 70 then commands the relay control circuit 80 to connect power of reverse polarity to power lines 82, 84 to the motor 20 such that the motor 20 reverses in the opposite direction to move the vehicle window 28 toward the lower limit position.

Figure 3A:
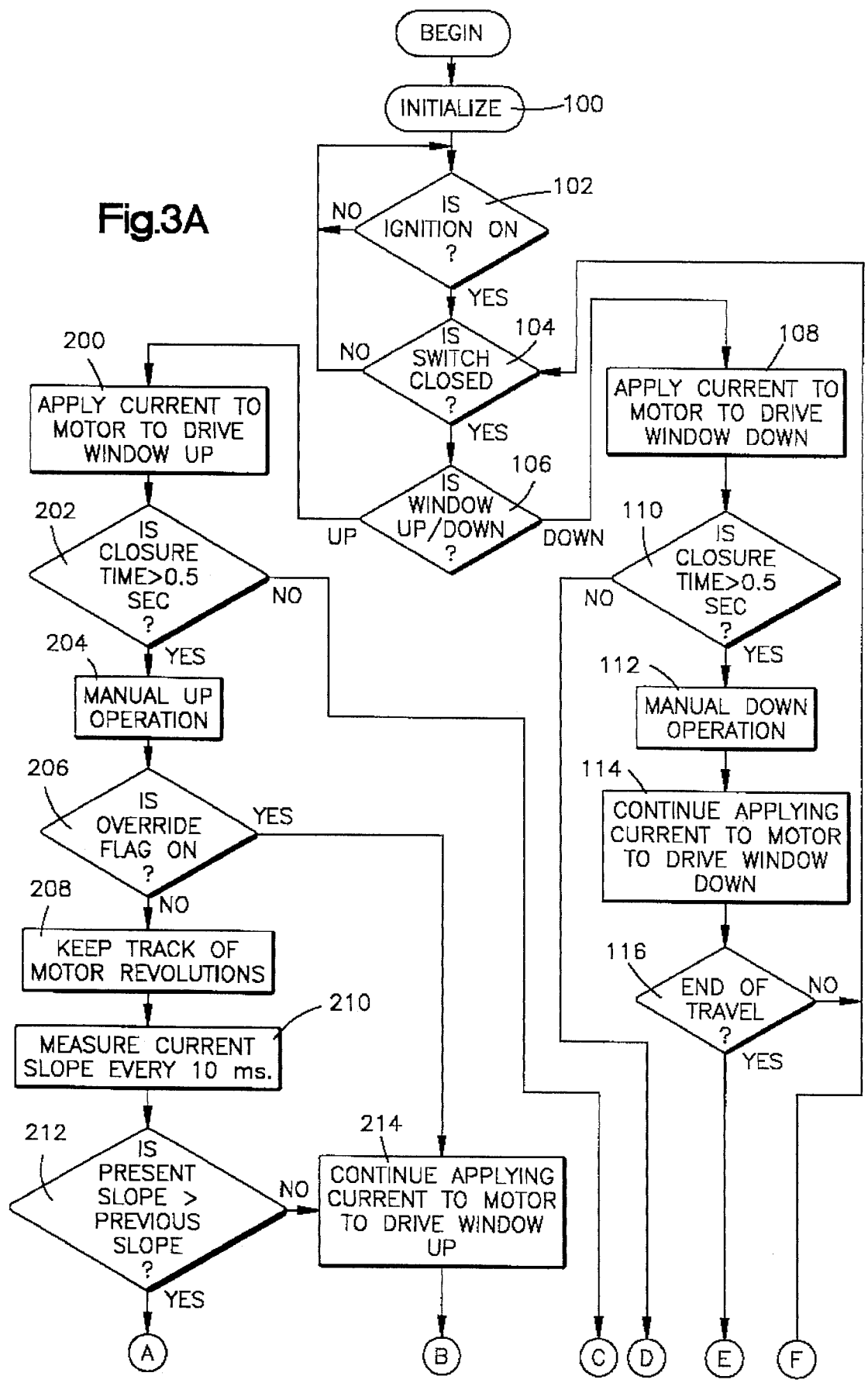
FIGS. 3A–3C are flow charts depicting operation of the control apparatus of FIG. 1 in accordance with the present invention.
Figure 3B:
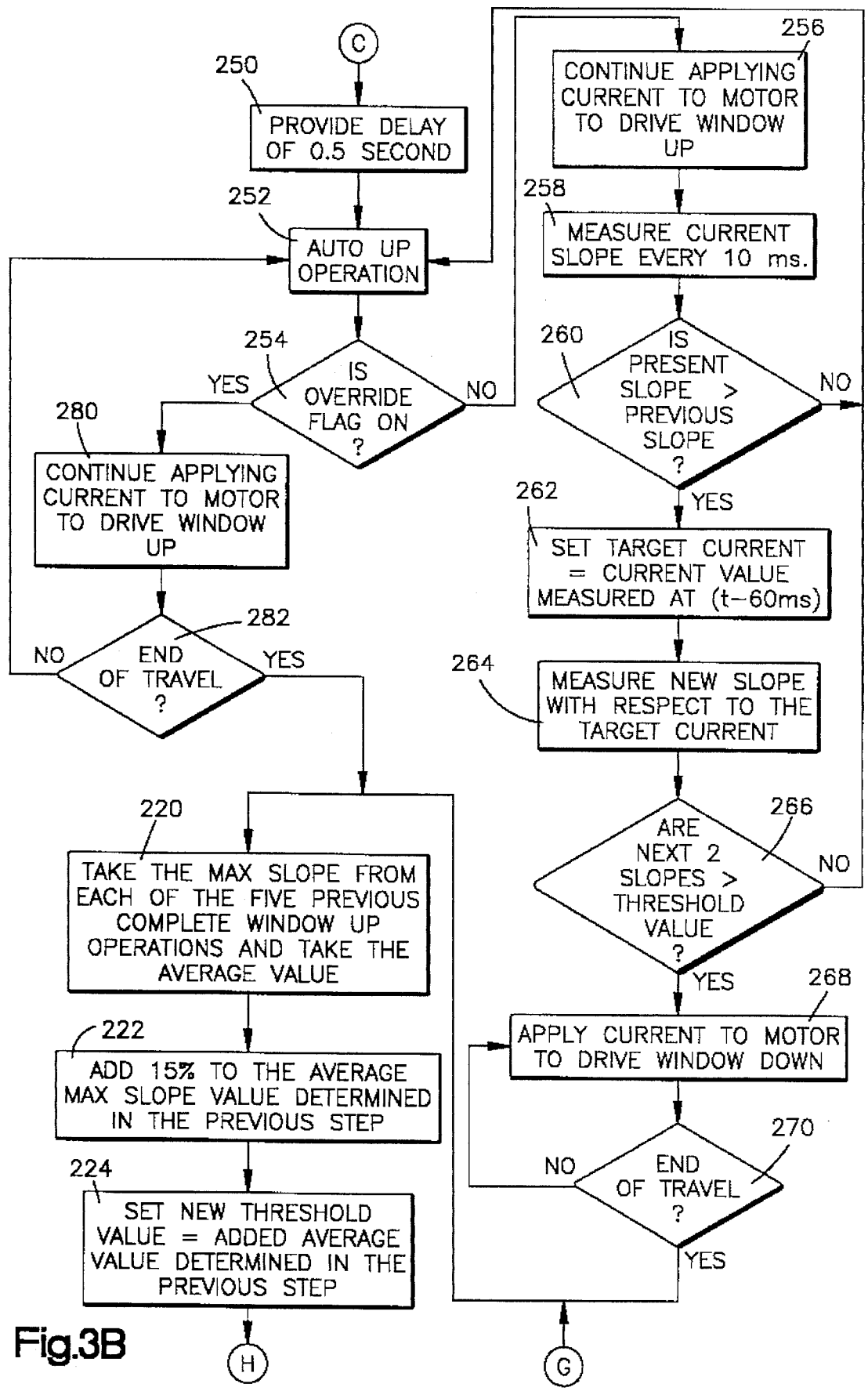
Figure 3C:
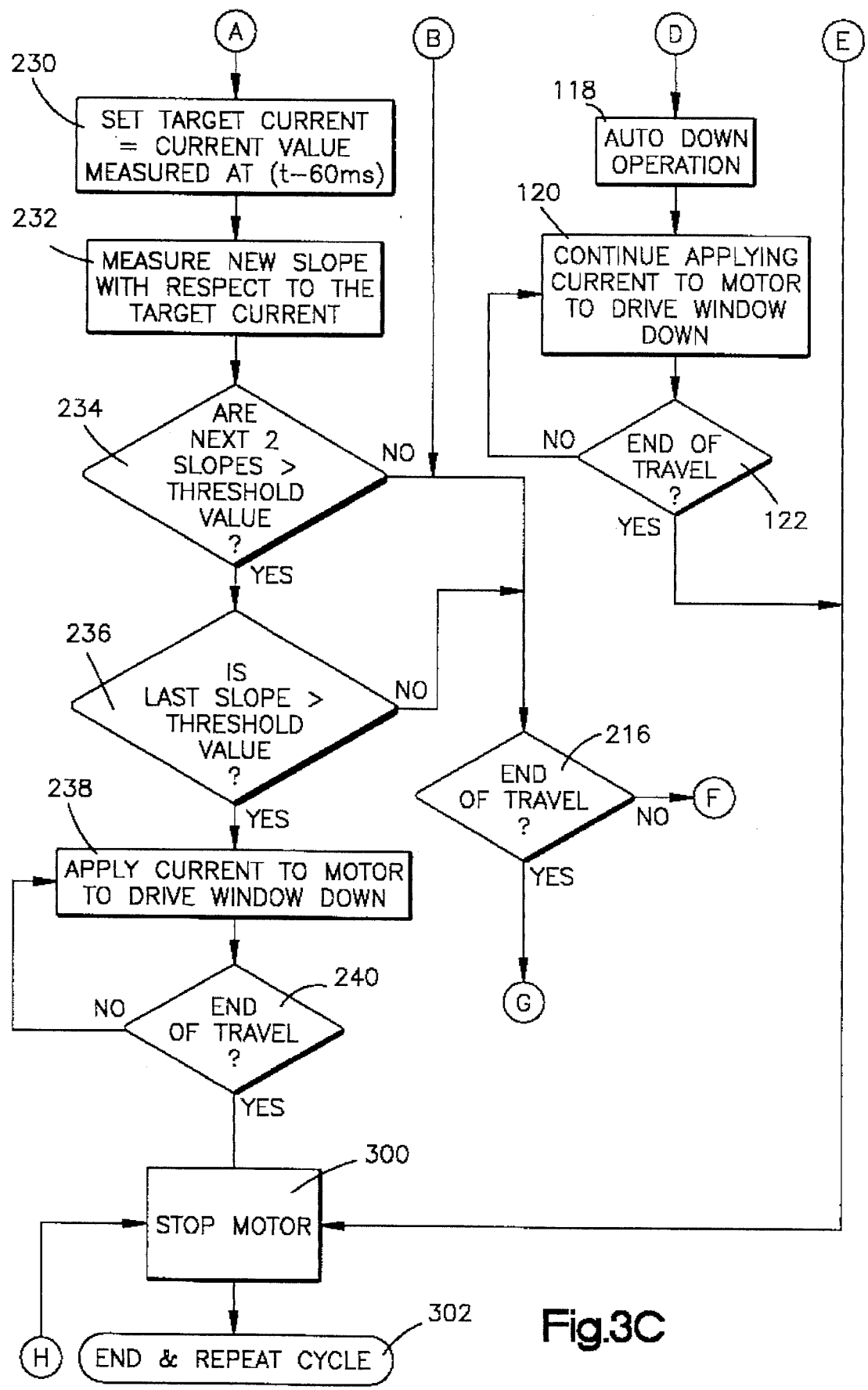

The microcomputer 70 follows a sequencing of control steps in accordance with the present invention, as explained in detail hereinbelow, to move the vehicle window 28 between the upper and lower limit positions. Referring to FIGS. 3A–3C, the sequence of manual steps followed by an operator and the sequence of control steps executed by the microcomputer 70, in accordance with the present invention, are depicted. The control steps executed by the microcomputer 70 are repeatedly executed every predetermined time interval after the microcomputer 70 is actuated and initialized.

In step 100, the electronics including the microcomputer 70 and the memory 78 are initialized. The microcomputer 70 performs a plurality of memory tests, determines whether all circuits are present and functional, and determines whether the program memory portion of the memory 78 is functioning correctly. Such pre-tests are well known in the art and are referred to as system self-diagnostics tests. If a pre-test failure has occurred, an error message is displayed in a known manner. The program then proceeds to step 102.

In step 102, a determination is made as to whether the vehicle ignition switch 30 is on. If the determination in step 102 is negative, the program will loop until the vehicle ignition switch 30 is turned on. If the determination in step 102 is affirmative, the program proceeds to step 104.

In step 104, a determination is made as to whether the vehicle window up/down switch 40 is closed. If the determination in step 104 is negative, the program loops back to step 102. If the determination in step 104 is affirmative, the program proceeds to step 106.

In step 106, a determination is made as to whether the window up/down switch 40 is pressed to the "DOWN" position or the "UP" position. If the determination in step 106 is that the switch 40 is pressed to the "DOWN" position, the program proceeds to step 108. In step 108, the relay control circuit 80 is energized so that current is applied to the motor 20 to drive the window 28 downward. The program then proceeds to step 110.

In step 110, a determination is made as to whether the window up/down switch 40 has been pressed to the "DOWN" position for at least 0.5 second. If the determination in step 110 is negative, the program proceeds to step 118 which indicates that the window 28 is being commanded to move automatically downward to the lower limit position. When this occurs, the relay control circuit 80 remains energized to apply current to the motor 20 to drive the window 28 downward, as depicted in step 120. The program then proceeds to step 122.

In step 122, a determination is made as to whether the window 28 has reached lower limit position. If the determination in step 122 is negative, the program loops back to step 120 to continue applying current to the motor 20 to drive the window 28 downward to the lower limit position. If the determination in step 122 is affirmative, the program proceeds to step 300 in which the relay control circuit 80 is deenergized so as to stop the motor 20. The program then ends in step 302 and returns to the beginning to repeat the program cycle.

If the determination in step 110 is affirmative, the program proceeds to step 112 which indicates that the window 28 is being manually operated to move the window 28 downward to the lower limit position. When this occurs, the relay control circuit 80 is energized to apply current to the motor 20 to drive the window 28 downward to the lower limit position, as depicted in step 114. The relay control circuit 80 remains energized to apply current to the motor 20 to drive the window 28 downward to the lower limit position so long as the window up/down switch 40 remains pressed to the "DOWN" position. The program then proceeds to step 116 in which a determination is made as to whether the window 28 has reached the lower limit position. If the determination in step 116 is negative, the program loops back to step 104. If the determination in step 116 is affirmative, the program proceeds to step 300 in which the relay control circuit 80 is deenergized so as to stop the motor 20. The program then ends in step 302 and returns to the beginning to repeat the program cycle.

If the determination in step 106 is that the window up/down switch 40 has been pressed to the "UP" position, the program proceeds to step 200. In step 200, the relay control circuit 80 is energized to apply current to the motor 20 to drive the window 28 upward to the upper limit position. The program then proceeds to step 202.

In step 202, a determination is made as to whether window up/down switch 40 has been pressed to the "UP" position for at least 0.5 second. If the determination in step 202 is negative, the program proceeds to step 250 in which a delay of 0.5 second is provided. The program then proceeds to step 252 in which the window 28 is being commanded to move automatically upward to the upper limit position. The program then proceeds to step 254. In step 254, a determination is made as to whether an OVERRIDE FLAG is on. The OVERRIDE FLAG is a software-defined variable which the vehicle operator can set.

If the determination in step 254 is negative, the program proceeds to step 256. In step 256, the relay control circuit 80 remains energized to apply current to the motor 20 to drive the window 28 upward to the upper limit position. The program then proceeds to step 258 in which the current slope value is determined every 10 milliseconds. The program determines the current slope value by subtracting a target current value stored in memory from the present current value. The program then proceeds to step 260 in which a determination is made as to whether the present current slope value is greater than the previous current slope value.

If the determination in step 260 is negative, the program loops back to step 252. If the determination in step 260 is affirmative, the program proceeds to step 262 to set a new target current value. The new target current value is set equal to the current value which was measured at (t–60) milliseconds, i.e., the measured current value which was made six measurements ago. The program then proceeds to step 264.

In step 264, a new current slope value is determined with respect to the new target current value as set forth in step 262. The program then proceeds to step 266. In step 266, a determination is made as to whether the next two slope determinations are greater than the threshold value stored in memory. If the determination in step 266 is negative, the program loops back to step 252. If the determination in step 266 is affirmative, the program proceeds to step 268.

In step 268, the relay control circuit 80 is energized to apply current to the motor 20 to drive the window 28 downward to the lower limit position. The program then proceeds to step 270 in which a determination is made as to whether the window 28 has reached the lower limit position. If the determination in step 270 is negative, the program loops back to step 268 to continue driving the window 28 downward to the lower limit position. If the determination in step 270 is affirmative, the program proceeds to step 220.

In step 220, the maximum slope value which was determined from each of the five previous complete window up operations is taken. These five maximum slope values are averaged to provide an average maximum slope value. The program then proceeds to step 222 in which 15 percent of the average maximum slope value determined in step 220 is added to the average maximum slope value. The program then proceeds to step 224 in which a new threshold value is obtained. The new threshold value is set equal to the average maximum slope value as determined in step 220 plus 15 percent of this value as determined in step 222. The program then proceeds to step 300 in which the relay control circuit 80 is deenergized so as to stop the motor 20. The program then ends in step 302 and returns to the beginning to repeat the program cycle.

If the determination in step 254 is affirmative, the program proceeds to step 280. In step 280, the relay control circuit 80 remains energized to apply current to the motor 20 to drive the window 28 upward to the upper limit position. The program then proceeds to step 282 in which a determination is made as to whether the window 28 has reached the upper limit position. If the determination in step 282 is negative, the program loops back to step 252 to continue moving the window 28 automatically to the upper limit position. If the determination in step 282 is affirmative, the program proceeds to step 220 to set a new threshold value in accordance with steps 220, 222, 224, as already described hereinabove.

If the determination in step 202 is affirmative, the program proceeds to step 204 which indicates that the window 28 is being manually operated to move the window 28 upward to the upper limit position. In step 206, a determination is made as to whether the OVERRIDE FLAG is on. If the determination in step 206 is affirmative, the program proceeds to step 214 to continue applying current to the motor 20 to drive the window 28 upward to the upper limit position. The program then proceeds to step 216 to determine if the window 28 has reached the lower limit position. If the determination in step 216 is negative, the program loops back to step 104. If the determination in step 216 is affirmative, the program proceeds to step 220 to set the new threshold value in accordance with steps 220, 222, 224, as already described hereinabove.

If the determination in step 206 is negative, the program proceeds to step 208 to keep track of the number of revolutions the motor 20 makes as the window 28 is being driven upward to the upper limit position. The program proceeds to step 210 in which the current slope value is determined every 10 milliseconds. The program determines the current slope value by subtracting the target current value stored in memory from the present current value. The program then proceeds to step 212.

In step 212, a determination is made as to whether the present current slope value is greater than the previous current slope value. If the determination in step 212 is negative, the program proceeds to step 214 to continue applying current to the motor 20 to drive the window 28 upward to the upper limit position. The program then proceeds to step 216 to determine if the window 28 has reached the upper limit position. If the determination in step 216 is negative, the program loops back to step 104. If the determination in step 216 is affirmative, the program proceeds to step 220 to set a new threshold value in accordance with steps 220, 222, 224, as already described hereinabove.

If the determination in step 212 is affirmative, the program proceeds to step 230. In step 230, a new target current value is set. The new target current value is set equal to the current value which was measured at (t–60) milliseconds, i.e., the measured current value which was made six measurements ago. The program then proceeds to step 232. In step 232 a new current slope is determined with respect to the new target current value as set forth in step 230. The program then proceeds to step 234.

In step 234, a determination is made as to whether the next two slope determinations are greater than the threshold value stored in memory. If the determination in step 234 is negative, the program proceeds to step 216 to determine if the window 28 has reached the upper limit position. If the determination of 216 is negative, the program loops back to step 104. If the determination in step 216 is affirmative, the program proceeds to step 220 to set a new threshold value in accordance with steps 220, 222, 224, as already described hereinabove.

If the determination in step 234 is affirmative, the program proceeds to step 236 to determine if the last determined slope is greater than the threshold value stored in memory. If the determination in step 236 is negative, the program proceeds to step 216 to determine if the window 28 has reached the upper limit position. If the determination in step 216 is negative, the program loops back to step 104. If the determination in step 216 is affirmative, the program proceeds to step 220 to set a new threshold value in accordance with steps 220, 222, 224, as already described hereinabove.

If the determination in step 236 is affirmative, the program proceeds to step 238. In step 238, the relay control circuit 80 is energized to apply current to the motor 20 to drive the window 28 downward to the lower limit position. The program then proceeds to step 240 to determine if the window 28 has reached the lower limit position. If the determination in step 240 is negative, the program loops back to step 238 to continue applying current to the motor 20 to drive the window 28 downward to the lower limit position. If the determination in step 240 is affirmative, the program proceeds to step 300 in which the relay control circuit 80 is deenergized so as to stop the motor 20. The program then ends in step 302 and returns to the beginning to repeat the program cycle.

A number of advantages result by using a control apparatus constructed in accordance with the present invention to control operation of the electric motor in response to an obstruction being encountered in the travel path of the vehicle window during its upward movement. One advantage is that the control apparatus has the ability to adapt to changing vehicle conditions, such as age and normal wear of the window mechanism 24. The control apparatus can also adapt to out of the ordinary vehicle conditions, such as damage to the track of the vehicle window 28 which would cause unusually high resistance to the operation of the vehicle window 28.

Another advantage is that the control apparatus is able to accommodate differences between vehicles of the same model due to manufacturing variations. Further, the control apparatus is capable of being adapted to the requirements of the particular vehicle in which it is assembled.

The above description in the present application discloses a current sensing arrangement which determines if an obstruction has been encountered in the travel path of a vehicle window during upward movement of the vehicle window. It is contemplated that it may be possible to use a pulse width sensing arrangement in place of the current sensing arrangement to determine if an obstruction has been encountered in the travel path of the vehicle window. In a pulse width sensing arrangement, the difference in pulse duration between consecutive pulses would be used as the criterion to determine if an obstruction has been encountered in the travel path of the vehicle window.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. An apparatus for controlling operation of an electric motor for moving a member between a first limit position and a second limit position, said apparatus comprising:

means for determining the rate of change of current flow to the motor during each movement of the member toward the second limit position;

means for storing a threshold rate of change of current flow value which is a function of a plurality of determinations made of the rate of change of current flow to the motor during movements of the member toward the second limit position;

means for modifying said stored threshold rate of change of current flow value on each movement of the member toward the second limit position to make said stored threshold rate of change of current flow value a function of the determinations made of the rate of change of current flow to the motor which are most current in time; and means for reversing the motor and moving the member toward the first limit position in response to a determined rate of change of current flow to the motor exceeding said stored threshold rate of change of current flow value during movement of the member toward the second limit position.

2. An apparatus according to claim 1 wherein said determining means includes a motor current flow measurement circuit which provides a motor current signal indicative of the current flow to the electric motor.

3. An apparatus according to claim 2 wherein said reversing means includes actuatable relay means which, when actuated, reverses the electric motor and moves the member toward the first limit position.

4. An apparatus according to claim 3 wherein said modifying means includes a microcomputer which monitors said motor current signal at different times and provides a rate of change of motor current signal by taking the difference between a first motor current signal monitored by said microcomputer at a certain time and a second motor current signal monitored by said microcomputer at a different time, said microcomputer producing a relay control signal to actuate said relay means and thereby to reverse the electric motor and move the member toward the first limit position in response to said rate of change of motor current signal exceeding said stored threshold rate of change of current flow value.

5. An apparatus according to claim 4 wherein said storing means includes a memory which is connected with said microcomputer, said stored threshold rate of change of current flow value being stored in said memory.

6. An apparatus according to claim 5 wherein said stored threshold rate of change of current flow value is an average value of said plurality of determinations made of the rate of change of current flow to the motor during movements of the member toward the second limit position.

7. An apparatus according to claim 6 wherein said plurality of determinations include five determinations made of the rate of change of current flow to the motor during movements of the member toward the second limit position.

8. An apparatus according to claim 1 wherein said stored threshold rate of change of current flow value is an average value of said plurality of determinations made of the rate of change of current flow to the motor during movements of the member toward the second limit position.

9. An apparatus according to claim 8 wherein said plurality of determinations include five determinations made of the rate of change of current flow to the motor during movements of the member toward said second limit position.

10. An apparatus for controlling operation of an electric motor for moving a vehicle window between an upper limit position and a lower limit position, said apparatus comprising:

means for determining the rate of change of current flow to the motor during an upward movement of the vehicle window toward the upper limit position;

means for storing a threshold rate of change of current flow value which is a function of a plurality of determinations made of the rate of change of current flow to the motor during upward movements of the vehicle window toward the upper limit position;

means for modifying said stored threshold rate of change of current flow value on each movement of the vehicle window to the upper limit position to make said stored threshold rate of change of current flow value a function of the determinations made of the rate of change of current flow to the motor which are most current in time; and means for reversing the motor and moving the vehicle window downward toward the lower limit position in response to a determined rate of change of current flow to the motor exceeding said stored threshold rate of change of current flow value during upward movement of the vehicle window toward the upper limit position.

11. An apparatus according to claim 10 wherein said determining means includes a motor current flow measurement circuit which provides a motor current signal indicative of the current flow to the electric motor.

12. An apparatus according to claim 11 wherein said reversing means includes actuatable relay means which, when actuated, reverses the electric motor and moves the vehicle window downward toward the lower limit position.

13. An apparatus according to claim 12 wherein said modifying means includes a microcomputer which monitors said motor current signal at different times and provides a rate of change of motor current signal by taking the difference between a first motor current signal monitored by said microcomputer at a certain time and a second motor current signal monitored by said microcomputer at a different time, said microcomputer producing a relay control signal produces to actuate said relay means and thereby to reverse the electric motor and move the vehicle window downward toward the lower limit position in response to said rate of change of motor current signal exceeding said stored threshold rate of change of current flow value.

14. An apparatus according to claim 13 wherein said storing means includes a memory which is connected with said microcomputer, said stored threshold rate of change of current flow value being stored in said memory.

15. An apparatus according to claim 14 wherein said stored threshold rate of change of current flow value is an average value of said plurality of determinations made of the rate of change of current flow to the motor.

16. An apparatus according to claim 15 wherein said plurality of determinations include five determinations made of the rate of change of current flow to the motor during movements of the vehicle window upward toward the upper limit position.

17. An apparatus according to claim 10 wherein said stored threshold rate of change of current flow value is an average value of said plurality of determinations made of the rate of change of current flow to the motor.

18. An apparatus according to claim 17 wherein said plurality of determinations include five determinations made of the rate of change of current flow to the motor during movements of the vehicle window upward toward the upper limit position.

19. A method for controlling operation of an electric motor for moving a member between a first limit position and a second limit position, said method comprising the steps of:

determining the rate of change of current flow to the motor during each movement of the member toward the second limit position;

storing a threshold rate of change of current flow value which is a function of a plurality of determinations made of the rate of change of current flow to the motor during movements of the member toward the second limit position;

modifying the stored threshold rate of change of current flow value on each movement of the member toward the second limit position to make the stored threshold rate of change of current flow value a function of the determinations made of the rate of change of current flow to the motor which are most current in time; and reversing the motor and moving the member toward the first limit position in response to a determined rate of change of current flow to the motor exceeding the stored threshold rate of change of current flow value during movement of the member toward the second limit position.

* * * * *